United States Patent
Balaya et al.

(10) Patent No.: US 9,327,990 B2
(45) Date of Patent: May 3, 2016

(54) PRODUCTION OF NANOSTRUCTURED $Li_4Ti_5O_{12}$ WITH SUPERIOR HIGH RATE PERFORMANCE

(75) Inventors: Palani Balaya, Singapore (SG); Srirama Hariharan, Singapore (SG)

(73) Assignee: National University of Singapore, Singapore (SG)

(*) Notice: Subject to any disclaimer, the term of this patent is extended or adjusted under 35 U.S.C. 154(b) by 192 days.

(21) Appl. No.: 14/137,110

(22) PCT Filed: Jun. 27, 2012

(86) PCT No.: PCT/SG2012/000227
§ 371 (c)(1),
(2), (4) Date: Dec. 20, 2013

(87) PCT Pub. No.: WO2013/002729
PCT Pub. Date: Jan. 3, 2013

(65) Prior Publication Data
US 2014/0220448 A1 Aug. 7, 2014

Related U.S. Application Data

(60) Provisional application No. 61/501,344, filed on Jun. 27, 2011.

(51) Int. Cl.
*C01G 23/00* (2006.01)
*C01D 15/02* (2006.01)
*H01M 4/131* (2010.01)
*H01M 4/485* (2010.01)
*B82Y 30/00* (2011.01)
*H01M 4/02* (2006.01)

(52) U.S. Cl.
CPC .......... *C01D 15/02* (2013.01); *B82Y 30/00* (2013.01); *C01G 23/005* (2013.01); *H01M 4/131* (2013.01); *H01M 4/485* (2013.01); *C01P 2002/32* (2013.01); *C01P 2004/62* (2013.01); *C01P 2004/64* (2013.01); *C01P 2006/16* (2013.01); *C01P 2006/40* (2013.01); *H01M 2004/021* (2013.01); *Y02E 60/122* (2013.01); *Y02P 70/54* (2015.11)

(58) Field of Classification Search
None
See application file for complete search history.

(56) References Cited

U.S. PATENT DOCUMENTS 7,368,097 B2 * 5/2008 Sterzel ............... 423/598
8,039,151 B2 * 10/2011 Inagaki et al. ........ 429/231.95

FOREIGN PATENT DOCUMENTS

| CN | 101618890 A | | 1/2010 |
| KR | 20100035881 A | | 4/2010 |
| WO | 2007-100918 | * | 9/2007 |
| WO | WO-2008067677 A1 | | 6/2008 |

OTHER PUBLICATIONS

Zhang et al., "Facile preparation of nanocrystalline . . . batteries", Electrochemistry Communications, Apr. 13, 2011, pp. 654-656.*
Jiang et al, "Effect of particle dispersion on high rate performance of nano-sized LiTi5O12 anode", Electrochimica Acta vol. 52, pp. 6470-6475. 2007.

* cited by examiner

*Primary Examiner* — Steven Bos
(74) *Attorney, Agent, or Firm* — Cesari and McKenna LLP

(57) ABSTRACT

A process of preparing nanostructured lithium titanate particles. The process contains the steps of providing a solvent containing a soft-template compound, a lithium ion-containing compound, and a titanium ion-containing compound; removing the solvent to obtain a lithium titanate precursor; and calcining the precursor followed by milling and annealing. Also disclosed is a nanostructured lithium titanate particle prepared by this process.

22 Claims, No Drawings

PRODUCTION OF NANOSTRUCTURED Li$_4$Ti$_5$O$_{12}$ WITH SUPERIOR HIGH RATE PERFORMANCE

CROSS-REFERENCE TO RELATED APPLICATIONS

This application is the National Stage of International Application No. PCT/SG2012/000227 filed on Jun. 27, 2012, which claims the benefit of U.S. Provisional Application No. 61/501,344 filed on Jun. 27, 2011. The contents of both applications are hereby incorporated by reference in their entirety.

BACKGROUND

Numerous materials capable of reversibly exchanging lithium ions have been investigated for the development of rechargeable lithium ion batteries. Lithium titanate, i.e., Li$_4$Ti$_5$O$_{12}$, is a promising active anode material for these batteries. See Ohzuku et al., Journal of the Electrochemical Society, 142, 1431 (1995); and Thackeray, Journal of the Electrochemical Society, 142, 2558 (1995).

High performance lithium ion batteries require nanostructured lithium titanate particles. Lithium titanate particles prepared by conventional solid state reactions have micron-sized particles, thus failing to meet the high performance requirement. Furthermore, solid state reactions consume a significant amount of the energy as they take place at a very high temperature (e.g., over 800° C.) for a long time (e.g., 24 hours). On the other hand, hydrothermal synthesis affords nanostructured spinel lithium titanate. See Tang et al., Electrochemistry Communications 10, 1513 (2008). However, the hydrothermal method suffers from low yields and is not suitable for mass production.

There is a need to develop a convenient method for preparing nanostructured lithium titanate particles with a high yield and at a low cost.

SUMMARY

This disclosure is based on the discovery of a process that can be used to prepare nanostructured lithium titanate particles at a lower temperature and a shorter calcination time as compared to the solid state method.

This disclosure provides a process to prepare nanostructured lithium titanate particles using a soft-template approach followed by high energy ball milling for substantial size reduction, without compromising the crystallanity of the particles. This process offers an unexpectedly high yield of the final product and is suitable for mass scale production.

The process includes the following steps: (a) providing a solvent containing a soft-template compound, a lithium ion-containing compound, and a titanium ion-containing compound; (b) removing the solvent to obtain a lithium titanate precursor; and (c) calcining the lithium titanate precursor to obtain crystalline lithium titanate particles.

In step (a), the solvent can be a mixture of ethanol and water (e.g., ethanol:water, 1:1 to 6:1 by volume, preferably 1:1 to 3:1); the soft-template compound can be octyltrimethylammonium bromide, decyltrimethylammonium bromide, dodecyltrimethylammonium bromide, tetradecyltrimethylammonium bromide, cetyltrimethylammonium bromide, octadecyltrimethylammonium bromide, trimethyloctadecylammonium chloride, docosyltrimethylammonium chloride, or a combination thereof; the lithium ion-containing compound can be lithium acetate, lithium chloride, lithium hydroxide, or lithium carbonate (e.g., lithium acetate and lithium chloride); and the titanium ion-containing compound can be titanium isopropoxide. The lithium ion-containing compound and the titanium ion-containing compound are in a stoichiometric proportion (e.g., 4:5 to 4.2:5 by mole), and the weight ratio of the soft-template compound to the lithium ion-containing compound is 1:2 to 3:2.

The lithium titanate precursor obtained in step (b) is calcined in step (c) at 600 to 800° C. for 2 to 8 hours (e.g., at 600 to 750° C. for 4 to 6 hours) to yield crystalline lithium titanate particles.

The crystalline lithium titanate particles thus obtained can be further ball milled at 200 to 600 rpm for 1 to 5 hours (e.g., 300 to 400 rpm for 3 to 4 hours) and annealed at 400 to 750° C. for 1 to 5 hours (e.g., at 500 to 700° C. for 1 to 2 hours).

Also within the scope of this disclosure is a nanostructured lithium titanate particle prepared by the above-described process.

Still within the scope of this disclosure is a nanostructured lithium titanate particle containing spinel lithium titanate crystals and having a particle size of 5 to 500 nm (e.g., 10-80 nm) and a pore size of 3 to 10 nm.

The details of one or more embodiments of the invention are set forth in the description below. Other features, objects, and advantages of the invention will be apparent from the description and from the claims.

DETAILED DESCRIPTION

This disclosure provides a cost-effective method of preparing mesoporous nanostructured lithium titanate particles, which can be used as an anode material in rechargeable lithium ion batteries (LIBs) for high power density applications. The rate performance of this nanostructured material exceeds that of micron sized particles of the same material.

The method includes three essential steps, i.e., steps (a)-(c), and two optional steps, i.e., a ball milling step and an annealing step. See the Summary section above. Each of these steps is described in detail below.

Step (a)

A mixture is provided in this step for preparing mesoporous nanostructured lithium titanium particles by soft-template synthesis. The mixture, which can be a solution or a slurry, contains a soft-template compound, a lithium ion-containing compound, a titanium ion-containing compound, and a solvent in a predetermined weight ratio. Preferably, it is a solution in which all the compounds are dissolved in a solvent. When the mixture is a slurry, it is preferred that the compounds are homogenously dispersed in the solvent. The compounds are preferably in a stoichiometric proportion (e.g., Li:Ti being 4:5 to 4.2:5 by mole).

The mixture is stirred at the room temperature or at an elevated temperature for adequate time to allow the formation of a lithium titanate precursor, which is coated with the soft-template compound. Without being bound by any theory, the mechanism for forming the nanocrystals is described in the International Patent Application Publication WO 2012/023904.

The soft-template compound, usually a carbon-containing surfactant (e.g., a cationic surfactant), can self-assemble into micelles at its critical micellar concentration. These micelles provide micro or meso pores for the growth of lithium titanate nanocrystals and also restrict them from overgrowth. The soft-template compound can be a surfactant that provides suitable micelle morphology and size for growing lithium titanate nanocrystals. For examples, see the Summary Section above.

The lithium ion-containing compound and the titanium ion-containing compound are the respective sources of the lithium ions and the titanium ions that form the lithium titanate nanocrystals. Preferably, these compounds are dissolved or dispersed as nanoparticles in a solvent. They can be provided in powder or particulate form. Hydrates of these compounds, when available, can also be used. Such compounds are well known in the art.

The lithium ion-containing compound can be an ionic compound of lithium, e.g., an organic lithium salt, an inorganic lithium salt, and lithium hydroxide. Examples include, but are not limited to, lithium fluoride, lithium chloride, lithium bromide, lithium iodide, lithium nitrate, lithium nitrite, lithium sulfate, lithium hydrogen sulfate, lithium sulfite, lithium bisulfite, lithium carbonate, lithium bicarbonate, lithium borate, lithium phosphate, lithium dihydrogen phosphate, lithium hydrogen ammonium phosphate, lithium dihydrogen ammonium phosphate, lithium silicate, lithium antimonate, lithium arsenate, lithium germanate, lithium oxide, lithium alkoxide, lithium enolate, lithium phenoxide, lithium hydroxide, a lithium salt with a carboxylic acid (e.g., acetate and oxalate) or a hydroxyl carboxylic acid (e.g., glycolate, lactate, citrate, and tartrate), and a combination thereof.

The titanium ion-containing compound can be an ionic compound, e.g., an organic salt and an inorganic salt. Examples include, but are not limited to, titanium fluoride, titanium chloride, titanium bromide, titanium iodide, titanium acetyl acetonate, titanium nitrate, titanium nitrite, titanium sulfate, titanium hydrogen sulfate, titanium sulfite, titanium bisulfite, titanium carbonate, titanium bicarbonate, titanium borate, titanium phosphate, titanium hydrogen ammonium phosphate, titanium dihydrogen ammonium phosphate, titanium oxide bis(2,4-pentanadionate), titanium sulfate oxide, titanium silicate, titanium antimonate, titanium arsenate, titanium germanate, titanium oxide, titanium hydroxide, titanium alkoxide, titanium enolate, titanium phenoxide, a titanium salt with a carboxylic acid (e.g., acetate and oxalate) or a hydroxyl carboxylic acid (e.g., glycolate, lactate, citrate, and tartrate), and a combination thereof. Note that titanium ions in these compounds may have an oxidation state that is different from that required by the lithium titanate product. Oxidizing or reducing conditions can be employed to bring the oxidation state of the starting ions to that required by the final product.

The solvent can be an inorganic or organic solvent. Examples include, but are not limited to, water, methanol, ethanol, propanol, butanol, hexanol, or a combination thereof. A preferred solvent is a mixture of ethanol and water (e.g., ethanol:water being 1:1 to 3:1 (v/v)).

Turning back to the mixture, it can be stirred to achieve complete dissolution or homogenous dispersion of the compounds, by both physical and chemical means, such as milling, spraying, shaking, high shear mixing, sonicating, condensing, and chemical reactions.

Step (b)

The solvent is removed (e.g., by evaporation at an elevated temperature, by filtration, and by centrifugation) from the mixture provided in step (a) to obtain a lithium titanate precursor.

Step (c)

The lithium titanate precursors thus obtained are calcined to obtain crystalline lithium titanate particles having a size of 50 to 1000 nm (e.g., 250 to 500 nm). The calcination is carried out at a high temperature (e.g., 750° C.) for an adequate duration (e.g., 4 to 6 hours). The crystalline lithium titanate particles thus obtained have mesopores of nano sizes (e.g., 3 to 10 nm). The mesopores are formed between two or more adjacent lithium titanate nanocrystals. The size of the mesopores can be controlled by calcination temperature and milling conditions, as described below. This step is preferably conducted in static air.

If desired, the crystalline lithium titanate particles can be ball milled. The ball milling speed (e.g., 300-400 rpm) and time (e.g., 3 to 4 hours), and the weight ratio of ball to lithium particle are optimized to afford the final nanoparticles of the size below 50 nm (e.g., 5 to 15 nm). Further, after the ball milling, the milled lithium titanate particles can be annealed (e.g., at 400 to 750° C. for 1 to 5 hours). The annealing removes lattice strains developed during the high energy milling and restores crystallanity lost also during the milling. The nanostructured lithium titanate particles thus obtained have a spinel crystal structure, a particle size 30 to 500 nm, a peak pore size distribution of 3 to 10 nm.

A person skilled in the art can determine without undue experimentation the types and amounts of solvent, the lithium ion-containing compound, and the titanium ion-containing compound. The skilled artisan can also determine other conditions, such as calcination time, milling speed, and annealing temperature.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Example 1

Preparation of Nanostructured Lithium Titanate Particles Using Cetyl Trimethyl Ammonium Bromide as a Soft-Template Compound Nanostructured lithium titanate particles were synthesized using simple gram-scale soft-template method followed by high energy ball milling and mild heat treatment. Firstly, 3.64-7.28 grams of cetyl trimethyl ammonium bromide was dissolved in a mixture of water and ethanol (120-240 ml taken in 3:1 volume ratio). To this solution were added lithium acetate (2.42-4.84 grams) and titanium isopropoxide (8.68-17.36 grams). The resulting mixture was stirred at ambient temperature for 24-48 hours. The solvent was removed by rotoevaporation at 70-80° C. to obtain a lithium titanate precursor. The precursor was calcined in static air at 600-750° C. for 4-6 hours to afford crystalline lithium titanate particles ("C16-LTO"). The particles were ball-milled at 300-400 rpm for 3-4 hours, followed by heating at 500-700° C. for 1-2 hours to yield nanostructured lithium titanate particles. The particles thus obtained ("LTO-BM-ANL") in general had a size of 50-80 nm.

Example 2

Preparation of Nanostructured Lithium Titanate Particles Using Octyltrimethyl Ammonium Bromide as a Soft-Template Compound The lithium titanate particles were also synthesized using the same procedures as described in Example 1 except that octyl trimethylammonium bromide was used instead of cetyl trimethylammonium bromide (in the amount of 2.42-4.84 grams). In addition, the amounts of lithium acetate and titanium isopropoxide were 1.68-3.36 grams and 6.025-12.05 grams respectively. The lithium titanate particles ("C8-LTO") in general had a size of 750-1000 nm before ball milling, and were tested in Example 4 below.

Example 3

Characterization of Nanostructured Lithium Titanate Particles

The powder X-ray diffraction (XRD) studies were conducted on the lithium titanate particles. The XRD patterns of the particles show that the particles contained pure phase of spinel lithium titanate crystals. The peaks of other phases, e.g., rutile and anatase $TiO_2$, disappeared after the lithium titanate precursor was calcined at 600-800° C. for 2-8 hours.

High energy ball milling caused the loss of crystallanity of lithium titanate particles, as evidenced by the disappearance of most prominent lithium titanate XRD peaks. Furthermore, the remaining peaks were broader and amorphous compared to those before milling.

Annealing the milled lithium titanate particles resulted in the reappearance of all the XRD peaks of the lithium titanate spinel crystals.

In addition to the XRD characterization, the particles were also viewed under a field emission scanning electron microscope (FESEM). The particle sizes of the pristine material C16-LTO (prepared in Example 1) and C8-LTO (prepared in Example 2) were in the ranges of 250 to 500 nm and 750 to 1000 nm respectively. The C16-LTO particles appeared well connected while the C8-LTO particles appeared to be relatively isolated. This difference indicates the importance of choosing a suitable surfactant for a desired particle size of lithium titanate material. Upon ball milling, drastic particle size reductions were observed in the FESEM images. The particle sizes of the ball milled samples, i.e., C16-LTO and C8-LTO, were 5-15 nm with some agglomeration. The particle size of the annealed samples, i.e., LTO-BM-ANL, was 20-30 nm with insignificant particle growth.

Example 4

Electrochemical Storage Performance of Nanostructured Lithium Titanate Particles In order to gauge the impact of different particle sizes on the electrochemical storage performance of nanostructured lithium titanate particles thus prepared, coin type lithium battery cells were fabricated. Metallic lithium was used as the reference electrode (anode). The cathode contained, by weight, the lithium titanate particles 75%, Super-p carbon black 15%, and a polyvinylidene fluoride based binder 10%. The electrolyte contained 1 mol/L $LiPF_6$ in the mixture of ethylene carbonate and diethyl carbonate (1:1, v/v). Celgard 2502 was used as the separator.

The cells were cycled at different current densities, i.e., 1C, 2C, 5C, 10C, 20C, 30C, 40C, 50C, 60C, 70C, 80C, and 100C, in which 1C relates to extracting 175 $mAhg^{-1}$ in hour time. The cells demonstrated unexpectedly stable storage capacities. For example, cells containing C8-LTO, C16-LTO, and LTO-BM-ANL showed a storage capacity of 105, 140, and 140 $mAhg^{-1}$ at 1C respectively. These cells also showed distinct discharge plateaus at 1.55 V and 1.61 V corresponding to lithium insertion (discharge) and lithium extraction (charging), respectively.

It is also unexpected that the cell containing LTO-BM-ANL could be fast charged without losing much of its capacity. The cell retained nearly 89% of its initial capacity at 1C after it was subjected to fast charging between 6 to 30 minutes (corresponding to 2C to 10C respectively). Furthermore, the cell was charged in 36 seconds to 3 minutes (corresponding to 100C to 20C). The results show that the cell had a remarkable capacity of 75 $mAhg^{-1}$ even at 100C rate.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A process of preparing nanostructured lithium titanate particles, the process comprising:
    providing a solvent containing a soft-template compound, a lithium ion-containing compound, and a titanium ion-containing compound;
    removing the solvent to obtain a lithium titanate precursor; and
    calcining the lithium titanate precursor to obtain crystalline lithium titanate particles,
wherein the solvent is a mixture of ethanol and water, the lithium ion-containing compound and the titanium ion-containing compound are in a stoichiometric proportion, and the weight ratio of the soft-template compound to the lithium ion-containing compound is 1:2 to 3:2.

2. The process of claim 1, further comprising, after the calcining step, ball milling the crystalline lithium titanate particles at 200 to 600 rpm for 1 to 5 hours to yield milled lithium titanate particles.

3. The process of claim 2, wherein the crystalline lithium titanate particles are ball milled at 300 to 400 rpm for 3 to 4 hours.

4. The process of claim 2, further comprising annealing the milled lithium titanate particles at 400 to 750° C. for 1 to 5 hours to yield nanostructured lithium titanate particles.

5. The process of claim 4, wherein the milled lithium titanate particles are annealed at 500 to 700° C. for 1 to 2 hours.

6. The process of claim 1, wherein the lithium titanate precursor is calcined at 600 to 800° C. for 2 to 8 hours.

7. The process of claim 6, wherein the lithium titanate precursor is calcined at 600 to 750° C. for 4 to 6 hours.

8. The process of claim 1, wherein the soft-template compound is dodecyltrimethyl-ammonium bromide, cetyltrimethylammonium bromide, octadecyltrimethylammonium bromide, tetradecyltrimethylammonium bromide, decyltrimethylammonium bromide, or octyltrimethyl-ammonium bromide; and the solvent is a mixture of ethanol and water, in which the weight ratio of ethanol to water is 1:1 to 6:1.

9. The process of claim 8, wherein the lithium ion-containing compound is lithium acetate, lithium chloride, lithium hydroxide, or lithium carbonate, and the titanium ion-containing compound is titanium isopropoxide.

10. The process of claim 9, further comprising, after the calcining step, ball milling the crystalline lithium titanate particles at 200 to 600 rpm for 1 to 5 hours to yield milled lithium titanate particles and annealing the milled lithium titanate particles at 400 to 750° C. for 1 to 5 hours to yield nanostructured lithium titanate particles, wherein the lithium titanate precursor is calcined at 600 to 800° C. for 2 to 8 hours.

11. The process of claim 10, wherein the lithium titanate precursor is calcined at 600 to 750° C. for 4 to 6 hours, the crystalline lithium titanate particles are ball milled at 300 to 400 rpm for 3 to 4 hours, and the milled lithium titanate particles are annealed at 500 to 700° C. for 1 to 2 hours.

12. The process of claim 9, wherein the lithium ion-containing compound is lithium acetate or lithium chloride and the titanium ion-containing compound is titanium isopropoxide.

13. The process of claim 12, further comprising, after the calcining step, ball milling the crystalline lithium titanate particles at 200 to 600 rpm for 1 to 5 hours to yield milled lithium titanate particles and annealing the milled lithium titanate particles at 400 to 750° C. for 1 to 5 hours to yield nanostructured lithium titanate particles, wherein the lithium titanate precursor is calcined at 600 to 800° C. for 2 to 8 hours.

14. The process of claim 13, wherein the lithium titanate precursor is calcined at 600 to 750° C. for 4 to 6 hours, the crystalline lithium titanate particles are ball milled at 300 to 400 rpm for 3 to 4 hours, and the milled lithium titanate particles are annealed at 500 to 700° C. for 1 to 2 hours.

15. The process of claim 8, wherein the soft-template compound is cetyl trimethylammonium bromide, dodecyl trimethylammonium bromide, or octyl trimethylammonium bromide; and the solvent is a mixture of ethanol and water, in which the weight ratio of ethanol to water is 1:1 to 3:1.

16. The process of claim 15, wherein the lithium ion-containing compound is lithium acetate, lithium chloride, lithium hydroxide or lithium carbonate; and the titanium ion-containing compound is titanium isopropoxide.

17. The process of claim 16, further comprising, after the calcining step, ball milling the crystalline lithium titanate particles at 200 to 600 rpm for 1 to 5 hours to yield milled lithium titanate particles and annealing the milled lithium titanate particles at 400 to 750° C. for 1 to 5 hours to yield nanostructured lithium titanate particles, wherein the lithium titanate precursor is calcined at 600 to 800° C. for 2 to 8 hours.

18. The process of claim 17, wherein the lithium titanate precursor is calcined at 600 to 750° C. for 4 to 6 hours, the crystalline lithium titanate particles are ball milled at 300 to 400 rpm for 3 to 4 hours, and the milled lithium titanate particles are annealed at 500 to 700° C. for 1 to 2 hours.

19. The process of claim 16, wherein the lithium ion-containing compound is lithium acetate or lithium chloride and the titanium ion-containing compound is titanium isopropoxide.

20. The process of claim 19, further comprising, after the calcining step, ball milling the crystalline lithium titanate particles at 200 to 600 rpm for 1 to 5 hours to yield milled lithium titanate particles and annealing the milled lithium titanate particles at 400 to 750° C. for 1 to 5 hours to yield nanostructured lithium titanate particles, wherein the lithium titanate precursor is calcined at 600 to 800° C. for 2 to 8 hours.

21. A nanostructured lithium titanate particle prepared by the process of claim 1, the nanostructured lithium titanate particle having a particle size of 30 to 500 nm and a pore size of 3 to 10 nm.

22. A nanostructured lithium titanate particle comprising spinel $Li_4Ti_5O_{12}$ crystals, wherein the particle has a particle size of 30 to 500 nm and a pore size of 3 to 10 nm.

* * * * *